United States Patent [19]

Beaussant et al.

[11] 4,230,097

[45] Oct. 28, 1980

[54] BREATHING AND ACCELERATION PROTECTION APPARATUS FOR AIRCRAFT CREW MEMBERS

[75] Inventors: Raymond Beaussant, Bretigny San Orge; Jacques Claude, Fresnes, both of France

[73] Assignee: Intertechnique, Plaisir, France

[21] Appl. No.: 921,090

[22] Filed: Jun. 30, 1978

[30] Foreign Application Priority Data

Jul. 1, 1977 [FR] France .................. 77 20345

[51] Int. Cl.³ ................................ A61B 19/00
[52] U.S. Cl. ........................ 128/1 A; 137/38
[58] Field of Search .......... 128/1 A; 2/2.1 A; 137/38

[56] References Cited

U.S. PATENT DOCUMENTS

| | | | |
|---|---|---|---|
| 3,158,149 | 11/1964 | Gray | 128/1 A |
| 3,430,642 | 3/1969 | Mack | 128/1 A |
| 3,734,078 | 5/1973 | Cramer et al. | 128/1 A |

Primary Examiner—Willis Little
Attorney, Agent, or Firm—Lane, Aitken, Ziems, Kice & Kananen

[57] ABSTRACT

A breathing and acceleration protection apparatus for the pilot of a fighter aircraft includes a source of pressurized respiratory gas (typically a liquid oxygen converter) and an anti-g regulator valve means fed by the source and connected to inflatable trouser pockets of a g-suit carried by the pilot. A demand regulator delivers respiratory gas to the pilot. The anti-g regulator valve includes an inertia body movable responsive to acceleration along a predetermined direction for increasing the pressure in the pockets and when an amount of acceleration in excess of 2 g is sensed. Additional means responsive to the aircraft altitude establish a static pressure in the pockets at a value which increases with altitude in the absence of acceleration.

14 Claims, 7 Drawing Figures

U.S. Patent Oct. 28, 1980 Sheet 1 of 3 4,230,097
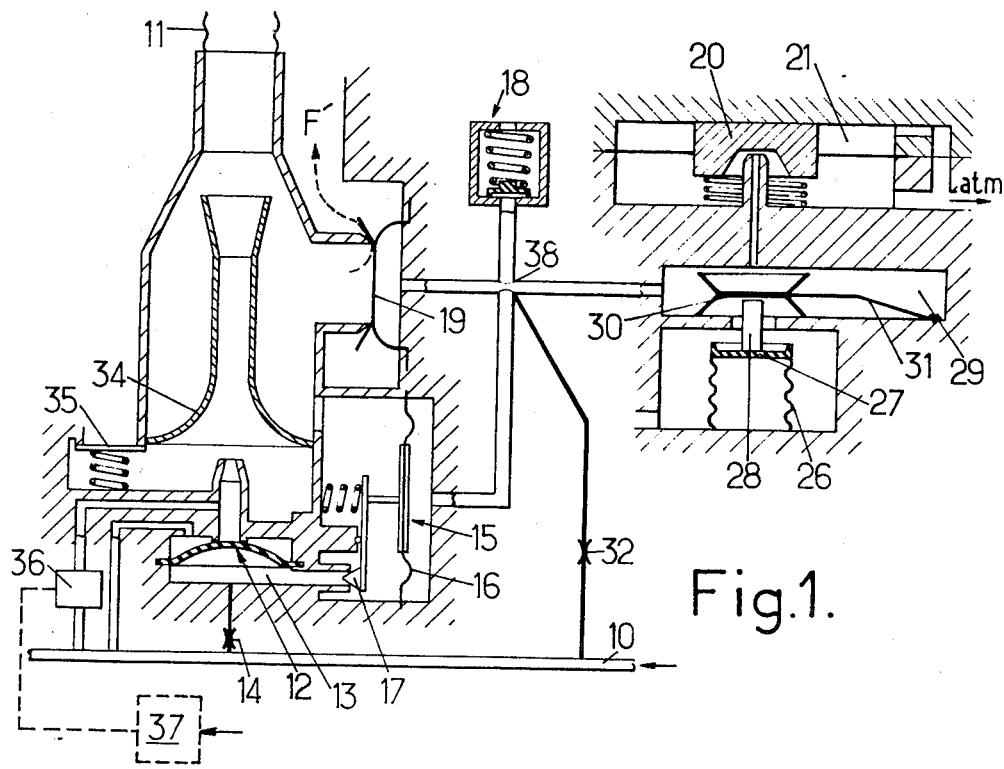
Fig.1.
Fig.2.
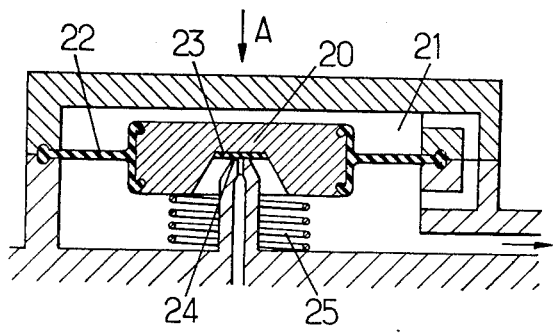
Fig.3.
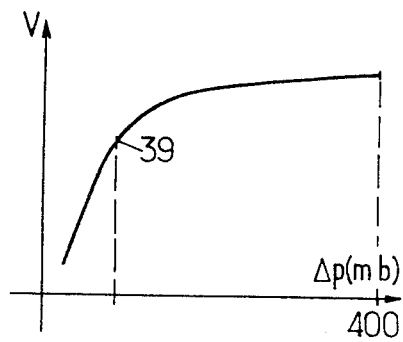

BREATHING AND ACCELERATION PROTECTION APPARATUS FOR AIRCRAFT CREW MEMBERS

BACKGROUND AND SUMMARY OF THE INVENTION

The present invention relates to apparatus for supplying breathing gas to crew members of fighter aircraft and protecting them against the effects of acceleration.

For coping with the ever increasing ceiling and performance of fighter aircraft, complex protection apparatuses have been designed. However, they have limitations and fail to maintain full protection under all circumstances.

First of all, the apparatus should supply the crew member with breathing gas whose composition and pressure are adjusted automatically to the variations of altitude which, for aircraft under design, may be as high as 30,000 m, which implies either the use of a space suit, or a pressurized helmet and a suit provided with pockets in which gas pressure is maintained at high altitudes. In present day suits, the protection against acceleration effects is ensured by inflating pockets provided in the trousers of the suit when a high acceleration is detected, particularly when pulling out from a dive or during a tight turn such as are encountered in dog fight. The two functions are generally provided by entirely separate systems. The pockets of trousers intended for protection against acceleration are separate and distinct from those intended to ensure pressurization at altitude. The presence of two independent systems makes the device complex and uncomfortable for the pilot.

More important, the pockets for protection against accelerations remain entirely empty during normal flight. As a consequence, the response time of the device (i.e. the time delay between the reception of the inflation order and the moment when the pressure in the pockets of the g-suit is such that effective protection is achieved) is quite substantial.

Most of the present systems for protection against accel erations are supplied with air from a pressurized air supply device which is in addition to the oxygen storage system for breathing purpose. To simplify the installation, it has already been proposed supplying the acceleration protection system from the pressurized oxygen store on board the aircraft. But then the bulk and weight of stored oxygen is increased. An additional limitation is that a liquid oxygen converter can hardly supply the large instantaneous flow rates required for quasi instantaneous inflation of the pockets of the anti-g trousers.

It is an object of the invention to provide an improved apparatus in which the shortcomings of the prior systems are overcome, at least to a large extent. It is an other object to provide an apparatus having improved acceleration detection means, suitable for miniaturization. It is another important object to simplify the individual equipment of the crew members.

According to an aspect of the invention, there is provided a breathing and acceleration protection apparatus for the crew of fighter aircrafts, having a source of pressurized respiratory gas, anti-g regulator valve means having an input connected to said source and an output constructed to be connected to inflatable trouser pockets of a g-suit carried by a member of said crew, and a demand regulator arranged to deliver respiratory gas to said crew member, wherein said anti-g regulator valve means include an inertia body movable along a predetermined direction responsive to acceleration along said direction, valve means controlled by said inertia body and controlling the pressure in said pockets as an increasing function of the acceleration, and additional means responsive to the aircraft altitude for setting a pressure in said pockets at a value which increases with altitude in the absence of acceleration.

The set pressure in the pockets may be controlled by an altimetric capsule associated with an oxygen valve; it may also be controlled by a pressure bleed from the breathing regulator.

The inertia body may be a mass suspended by a diaphragm disposed perpendicularly to the direction of the accelerations to be detected and in a plane passing approximately through the center of gravity of the mass.

The regulator controlling the gas pressure in the pockets of the trousers may be provided with means for pre-inflating, under a limited pressure, the pockets of the trousers as soon as the flight controls of the aircraft are placed in a position which will cause an acceleration of the aircraft. The reaction time is thus considerably reduced and the crew members benefit from anti-g protection as soon as they are subjected to the acceleration, which is not the case at the present time. This arrangement is particularly easy to implement in the case of those aircrafts which comprise an electrical transmission control system, frequently called "fly by wire". The signal fed to the regulator may be derived from the control. A signal processing circuit, using for example an amplifier, a timer, possibly a correction network (proportional-derivative circuit) may be used for adapting the control to the particular type of aircraft concerned.

Whatever the solution, the protective suit may consist of anti-g trousers, whose pockets are also inflatable to ensure the necessary pressurization at high altitudes, and a pressurized waistcoat, without it being necessary to provide a pneumatic connection between trousers and waistcoat.

The invention will be better understood from a reading of the following description of particular embodiments.

SHORT DESCRIPTION OF THE DRAWINGS

FIG. 1 is a schematic diagram of the anti-g part of a first embodiment of the invention;

FIG. 2 is a schematical view in cross-section of the acceleration responsive unit of the installation of FIG. 1, with the inertia body in the position assumed during acceleration;

FIG. 3 is a curve indicating the variation of the volume V of the protective pockets plotted vs pressure;

DETAILED DESCRIPTION OF PREFERRED EMBODIMENTS

Figure 4:
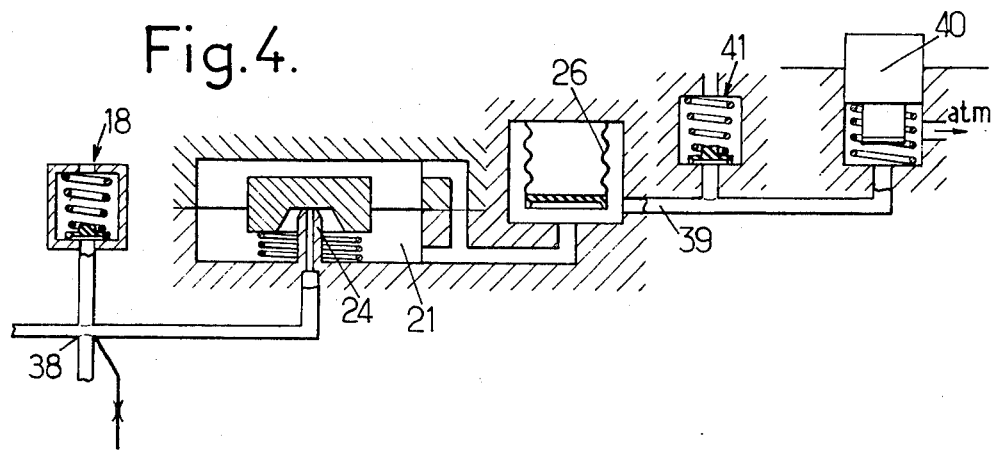
FIGS. 4 and 5 show anti-g regulators constituting variations of the regulator shown in FIG. 1.

Referring to FIG. 1, there is illustrated the part of a complete apparatus which controls the pressure in the trouser pockets of the g-suit of a pilot in quite simplified form.

The apparatus has a pressurized gas supply pipe 10. The gas will for example be oxygen delivered by a liquid oxygen converter carried on board (not shown in FIG. 1) or air at a pressure of a few bars (5 bars for example) from a bottle. The trouser pockets are connected to the apparatus by a flexible pipe 11.

Some of the units in the installation shown in FIG. 1 (where the scale is not respected) are conventional and will only be briefly described. They comprise a main valve 12 formed by a fixed seat and a main diaphragm. In rest condition, the diaphragm is applied against the seat and separates pipes 10 and 11. When a control chamber 13, limited by the rear of the main diaphragm and the casing which clamps its periphery, is subjected to the oxygen pressure in pipe 10, the diaphragm is applied against its seat and closes the passage in the seat.

The pressure which prevails in chamber 13, connected to pipe 10 by a restrictor 14, is controlled by a pilot valve 15. The pilot valve comprises a pressure sensitive diaphragm 16 controlling a closure member 17 which cooperates with a fixed seat communicating chamber 13 with pipe 11.

The pressure prevailing at the rear of diaphragm 16 is determined by control and safety valves.

A conventional safety valve 18, adjusted for example to open under a pressure differential of 470 mbars, prevents an excessive overpressure from occuring behind diaphragm 16. Another valve 19 allows the air contained in the trouser pockets to discharge to the atmosphere, as shown by arrow F', when the pressure applied at the rear of membrane 16 is decreasing.

A first control valve is acceleration responsive. Referring to FIG. 2, that control valve has an inertia body 20 of unique design. Body 20, whose weight is of some tens of grammes, is contained in a chamber 21 provided in a fixed housing and connected to the atmosphere of the cabin. Body 20 is carried by a diaphragm 22 whose periphery is secured to the housing. Diaphragm 22 is disposed transversely to the direction A of the accelerations to be detected. Its inner part is secured to the radially outer portion of body 20 in such a location that, at rest, the plane of the diaphragm passes approximately through the center of gravity of body 20. Body 20 is formed with a surface substantially perpendicular to direction A, passing approximately through the center of gravity of the mass, and fitted with a flat seal 23. That seal is arranged to be sealingly applied against a fixed seat 24 which limits a calibrated opening of small diameter upon occurence of an acceleration to be detected. A return spring 25 biases the bearing face away from seat 24 at rest. When an acceleration occurs in direction A, face 23 is applied against seat 24 and closes the opening, as shown in FIG. 2. The housing limits the amount of movement of body 20 from seat 24 to a length which is only slightly greater than the degree of opening required for operation.

The diaphragm may be made from moulded silicone rubber and be secured to the mass either by moulding or by forced engagement. The opening in the seat will generally be very small (typically its diameter is from 2 to 3 mm). The housing may be miniaturized, especially if seat 24 is formed by a sapphire through which a very small diameter hole may be bored. The stiffness of the spring will be such that body 20 is applied on seat 24 only if an acceleration of about 2 g (twice the acceleration of gravity) or more is impressed to it.

Referring again to FIG. 1, the pressure behind the diaphragm 16 of the pilot valve is modified depending on the altitude.

For this purpose, the apparatus comprises an altitude responsive capsule 26 subjected to the pressure which prevails in the aircraft cabin. The capsule 26 comprises bellows closed by end plates and limiting a space under a vacuum. The resiliency of the bellows or a spring in the center of the bellows tends to expand it axially against the pressure differential force across the bellows. The bottom end plate is carried by a fixed housing and the other end plate constitutes a closure member 27 provided with a pin 28 projecting outwardly. When the pressure in the cabin is close to atmospheric pressure at sea level, closure member 27 clears an opening of the housing. On the other hand, when the cabin pressure falls below a predetermined value (typically 200 mbars absolute), member 27 separates the inside of the housing from a relay chamber 29.

The opening in seat 24 communicates with the rear of diaphragm 16 of the pilot valve 15 through relay chamber 29. To prevent unwarranted interference between the action of the inertia body and that of the altitude responsive capsule 26, relay chamber 29 contains a double action valve 30. At rest, a resilient return blade 31 maintains valve 30 in a position in which it separates relay chamber 29 from the housing of the capsule and connects relay chamber 29 to the passage in seat 24 (FIG. 1). On the other hand, when closure member 27 is forced toward its seat, the projecting pin 28 pushes the double action valve 30 and separates the relay chamber 29 from the opening in seat 24.

The surface area of closure member 27 on which the pressure in relay chamber 29 exerts a force is selected so that the pressure in chamber 29 assumes a value depending on the pressure in the cabin, which itself is controlled responsive to the altitude of the aircraft.

The apparatus further comprises a conventional restrictor 32 connecting pipe 10 to the relay chamber and to the rear of membrane 16 and delivering a permanent small rate of oxygen flow.

In the embodiment illustrated in FIG. 1, the oxygen gas flow admitted through valve 12 is not fed directly to the pockets of the protective trousers, but used as a driving gas in an ejector 34 supplied with air coming from the cabin through a non-return check valve 35.

This arrangement has several advantages: the required primary oxygen flow may be considerably smaller than the rate of flow to be supplied to the trousers, and consequently the movable parts of the apparatus can be miniaturized. The consumption of gas from pipe 10 is considerably reduced, which is particularly important in the case where the gas is oxygen which also supplies the breathing device: the ratio of the rates of flow of driven air and driving gas may be as high as 8:1. Finally, the oxygen flow is considerably reduced and become compatible with the possibilities of liquid oxygen converters.

Referring to FIG. 1, there is shown in dotted line a circuit for pre-inflating the pockets of the protective trousers even before the inertia body is subjected to an acceleration. The circuit comprises a solenoid actuated valve 36 and a control circuit 37. That arrangement is particularly suitable in the case of "fly by wire" flight controls, with electrical transmission of orders. Then the electrical signal for the valve can be picked up from the transmission and processed. The processing will depend on the aerodynamics and control characteristics of the aircraft and on the situation conditions such as for example speed, altitude, etc.

In practice, the electrical circuit will comprise typically essentially a timer which, on receiving a signal indicating that the aircraft controls are in condition which will cause an acceleration in direction A, will apply to solenoid valve 36 an opening signal for a predetermined period of time, corresponding to the building-up of an appropriate pressure (typically 3 seconds).

The advantage of pre-inflation of the pockets of the trousers protecting against accelerations appears from FIG. 3, illustrating the variation of the volume of the pockets as a function of the pressure Δp over the environment. When pressurized gas is fed into the pockets, from a pipe whose flow rate is inherently limited, in a first stage the volume of the pockets increases and then, once the pockets are completely expanded, the volume no longer changes but the pressure goes on increasing until it reaches the value in the supply pipe.

The pilot is protected only from the moment when the pressure in the pockets is close to the final appropriate value. Now, a time delay as long as one second may be necessary for reaching the required pressure and this is sufficient for the pilot to have been subjected to the action of the acceleration to such an extent that his faculties are detrimentally affected temporarily. Since pre-inflation leads, before the accelerations are undergone, to a condition of the pockets represented by point 39 on FIG. 3, the deficiencies of previous systems may be removed.

The pre-inflation may be effected, as shown in FIG. 1, by a timing system which limits the time duration of gas feed and indirectly limits the pressure reached. A limit pressure valve adjusted to a predetermined pressure and associated with solenoid valve 36 may also be used to cut off the supply as soon as the pressure reaches the value indicated by point 39 which may for example correspond to a pressure of about two thirds of the final pressure.

The electrical control will be adjusted so that it comes into action only if an acceleration greater than the usual threshold of the anti-g valve (typically 2 g) is anticipated due to the change of position of the controls.

Numerous modifications of the embodiment of FIG. 1 are possible. In the modification shown in FIG. 4 (where only those elements belonging to a circuit different from that of FIG. 1 have been shown), there is no double action valve. Point 38, connected to safety valve 18, the rear chamber of pilot valve 15, valve 19 and restriction 32, is also connected to opening in seat 24 directly. Chamber 21 does not open to atmosphere but to another chamber locating capsule 26. The latter chamber opens to atmosphere.

That embodiment is simpler than that of FIG. 1. On the other hand, the actions of the inertia body regulator and of the altitude responsive capsule are cumulative. In other words, the overpressure at the outlet of valve 12 will be the sum of the overpressure due to the acceleration and caused by the regulator and the overpressure caused by the altitude responsive capsule. The solution remains however acceptable in most cases. In fact, the overpressure remains limited to the value of the pressure to which safety valve 18 is set (470 mbars for example).

Referring to FIG. 4, there is shown a conventional test circuit, with which the device of FIG. 1 may also be equipped. The test circuit, which makes it possible to check the integrity and operability of the apparatus before flight, is located between the outlet 39 of the chamber occupied by the altitude responsive capsule 26 and the atmosphere. In FIG. 1, it could be placed between chamber 21 and the atmosphere. It includes a push-button 40 biased by a spring to a position where it communicates outlet 39 and the atmosphere. By depressing the button, the operator separates outlet 39 from the atmosphere, the pressure increases behind diaphragm 16 of the pilot valve and the pockets of the protective trousers inflate to a pressure level determined by the pressure limitation valve 41.

Figure 5:
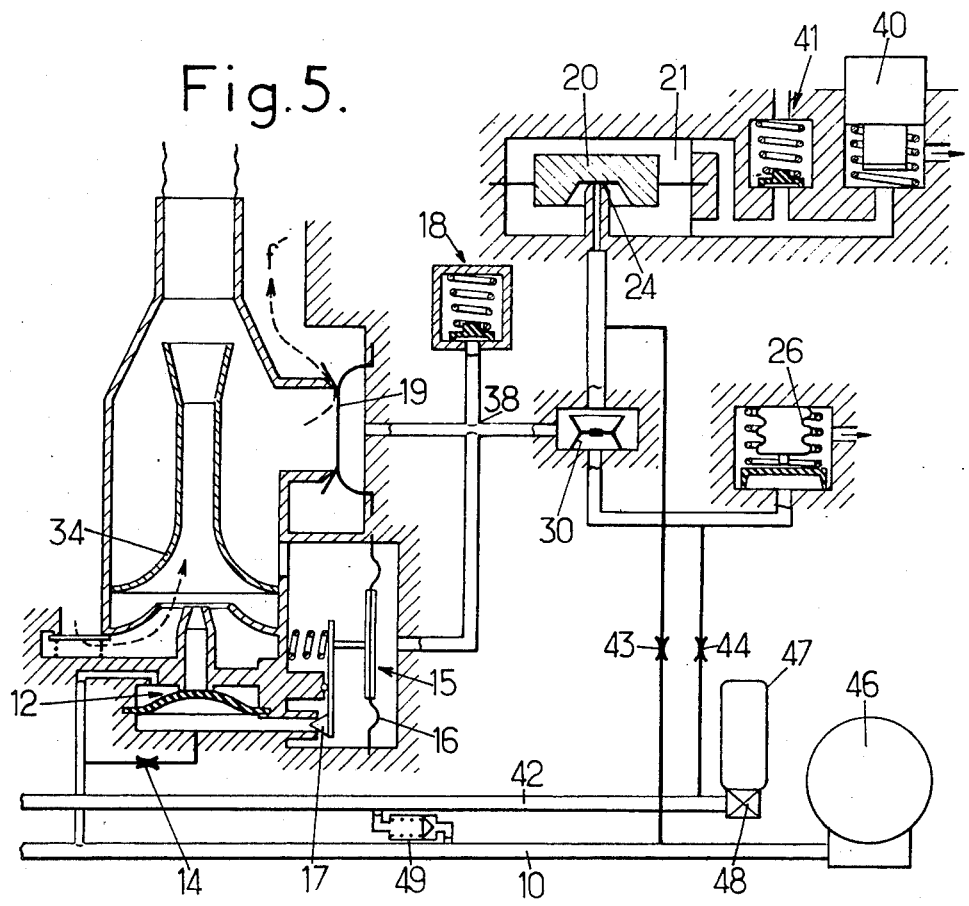

In the modification shown schematically in FIG. 5, as in the case of FIG. 1, there is no addition of pressurization "orders", but override by the order which corresponds to the highest overpressure. The apparatus is supplied by the main oxygen supply pipe and by the emergency supply pipe 42 carried by the ejection seat. In FIG. 5, the parts corresponding to those in FIG. 1 bear the same reference number. There is again provided an inertia body 20 and the associated systems as well as an altitude responsive capsule 26. Instead of providing a restrictor 32 supplying point 38, the apparatus comprises a first restrictor 43 connecting the normal supply pipe 10 to the opening provided in seat 24 of the inertia body and a second restrictor 40 connecting the emergency supply pipe 42 with the passage linking the chamber occupied by capsule 26 and double action valve 30. The latter is not provided with a return spring. Main valve 12 is supplied from normal oxygen pipe 10.

It will be seen that the emergency supply, of limited capacity, of such an apparatus is reserved for indispensable functions after bail out of the crew member.

The main pipe 10 is supplied by the main aircraft oxygen storage system, such as a liquid oxygen converter 46 carried by the aircraft. The emergency pipe 42 is supplied by an emergency oxygen cylinder 47, fitted with a pressure reducer 48 and carried by the seat. A non-return check valve 49 allows the converter 46 to supply also emergency pipe 42, except in case of ejection.

In normal operation, converter 46 delivers oxygen for fulfilling all functions, namely inflating the pockets of the trousers (anti-g function), supplying the breathing mask and the helmet of the pilot, and inflating the pockets of the suit (breathing and pressurization functions) under high altitude conditions.

Upon bail out at high altitude, the pockets of the trousers are already inflated; anti-g protection can no longer be provided, since the opening in the seat of the inertia body loses its oxygen supply; valve 49 closes, isolating pipe 42 which continues to supply the compartment of capsule 26. The latter will, as the altitude decreases, progressively reduce the pressure in the pockets of the trousers by reducing the pressure valve 19. It will be seen that protection against low external pressure is retained after ejection to ensure that the crew member remains conscious.

The altitude responsive capsule 26 may be replaced by a pressure pick-up either from the high pressure stage or from the outlet of the demand regulator which supplies the wearer of the g-suit with breathing gas. The double action valve 30 then prevents inertia body 20 from interfering with the pressure of the breathing gas. The demand regulator may for instance be of the type disclosed in French Patent Application No. 2,288,346 in the name of the Assignee of the present invention and to which reference may be made.

A cascade arrangement of several double valves such as 30 may be used for mixing a number of orders greater than two and insuring that the order corresponding to the highest pressure will override the others.

Up to now, there has been described the control of the pressure in the pockets of the trousers to provide anti-g protection and pressurization functions. As indicated above, the breathing mixture regulator of the apparatus may preferably cooperate with the anti-g regulator.

Figure 6:
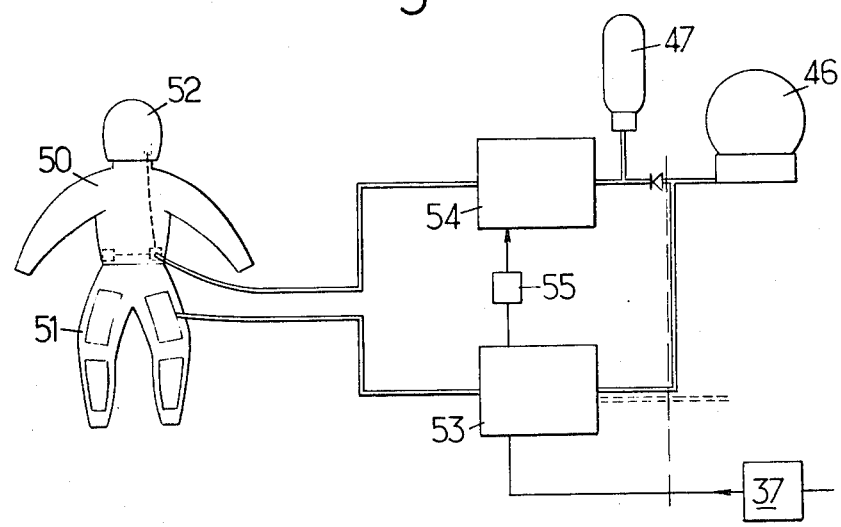
FIG. 6 is a block diagram showing the main components of another embodiment.

Referring to FIG. 6, there is shown a block diagram of an embodiment in which cooperation is provided. The pilot has a waistcoat 50 and trousers 51 with inflatable pockets as well as a pressurized helmet 52. Anti-g regulator 53, e.g. of the type shown in FIG. 5, is supplied by converter 46 or by another supply, such as the compressor of a turboreactor (as shown by dashed lines). The breathing mixture regulator 54 is normally fed by converter 46 and in emergency by cylinder 47. It supplies waistcoat 50 and helmet 52. In the figure a dot-dash line separates the parts carried by the seat from those carried by the aircraft structure, for the sake of clearness.

Figure 7:
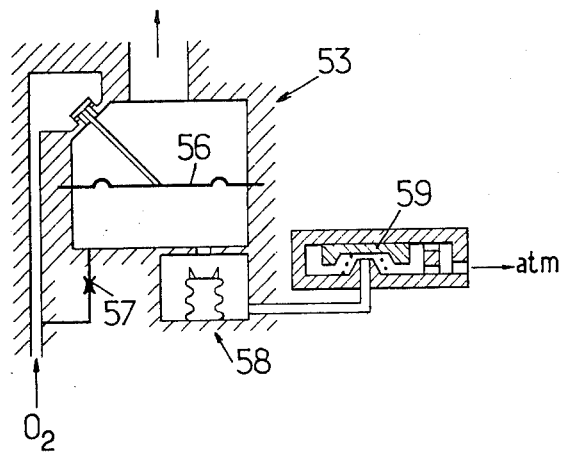
FIG. 7 is a sketch of a breathing regulator for use in the device of FIG. 6.

Breathing regulator 54 is advantageously designed to establish an overpressure of the breathing gas responsive to an acceleration. For that, either an inertia unit can be added to regulator 53 or a signal can be fed thereto by regulator 54. In the second case, it will be sufficient to take the pressure between seat 24 and double action valve 30 (FIG. 1) or else at the outlet of regulator 54 and to feed it to regulator 53 through a pressure divider, as shown schematically in FIG. 6. In the first case, the arrangement shown schematically in FIG. 7 may be adopted. The compartment situated behind demand diaphragm 56 is connected by a gauged restrictor 57 to the oxygen supply and, by a passage controlled by an altitude responsive capsule 58, to the atmosphere of the cabin. There is located, in the path between the capsule and the atmosphere, an inertia unit 59, designed so as to control the overpressure in dependence on the acceleration with however an increase which is much lesser than that controlled by inertia block 20. Because the overpressure controlled by inertia block 59 will always remain low, the orders of the inertia block and of the capsule can be summed. However, an arrangement for mixing orders by means of a double valve comparable to that of FIGS. 1 and 5 is possible.

Putting the breathing mixture under an overpressure which is an increasing function of the acceleration prevents the air cells of the lungs from being compressed. An overpressure of 5 to 10 mbars/g, much smaller than the pressure Δp for inflating the pockets, is sufficient.

Whatever the embodiment used, the protective garment can be considerably simplified. The same set of trouser pockets ensures protection against acceleration effects and against altitude, as well as against loss of pressurization due to breakage of the pilot's canopy or ejection.

We claim:

1. A breathing and acceleration protection apparatus for the crew of fighter aircraft, having a source of pressurized gas, anti-g regulator valve means having an input connected to said source and an output constructed to be connected to inflatable trouser pockets of a g-suit carried by a member of said crew, and a demand regulator arranged to deliver respiratory gas to said crew member, wherein said anti-g regulator valve means include an inertia body movable along a predetermined direction responsive to acceleration along said direction, valve means controlled by said inertia body and controlling the pressure in said pockets as an increasing function of the acceleration, and additional means responsive to the aircraft altitude for setting a pressure in said pockets at a value which increases with altitude in the absence of acceleration.

2. An apparatus according to claim 1, wherein said additional means comprises a capsule subjected to the pressure in the aircraft cabin and controlling communication between said cabin and a pilot chamber of said valve means.

3. An apparatus according to claim 1, wherein said additional means comprises a relay chamber having an inlet continuously communicating with a pilot chamber of a main valve controlling flow of gas from said source to said pockets, and two outlets, a double action valve in said relay chamber arranged for communicating said inlet to that of the outlets where the higher pressure prevails, one of said outlets being connected to said valve means and the other of said outlets being connected to the outlet of the demand regulator.

4. An apparatus according to claim 1, wherein the inertia body is suspended by a diaphragm placed perpendicular to the axis of the accelerations to be detected and in a plane passing approximately through the center of gravity of the mass.

5. An apparatus according to claim 4, wherein said body is formed with a surface situated perpendicularly to the direction of the accelerations to be detected, passing through the center of gravity of the body and arranged for cooperation with a fixed seat and is biased away from said seat by resilient return means.

6. An apparatus according to claim 1, wherein said source is a source of pressurized oxygen and said anti-g regulator comprises an ejector nozzle for diluting the oxygen flow with air coming from the aircraft cabin.

7. An apparatus according to claim 1, further comprising means for increasing the respiratory gas pressure responsive to acceleration.

8. An apparatus according to claim 7, wherein the overpressure is controlled by an additional inertia body arranged to cause an overpressure less than that controlled by the inertia body of the anti-g regulator.

9. An apparatus according to claim 1, further comprising at least one double action valve for mixing orders coming from different regulating members determining the pressure in the pockets of the protective trousers.

10. An apparatus according to claim 1, wherein said anti-g regulator valve means further comprises means for providing a predetermined preinflation of the trouser pockets responsive to an electrical order from the flight controls when the latter are placed in a position which will cause an acceleration.

11. A breathing and acceleration protection apparatus for the crew of fighter aircraft, having a source of pressurized gas, anti-g regulator valve means having an input connected to said source and an output constructed to be connected to inflatable trouser pockets of a g-suit carried by a member of said crew, and a demand regulator arranged to deliver respiratory gas to said crew member, wherein said anti-g regulator valve means includes:

a main valve having a movable member controlling communication between said source and said trouser pockets and limiting a control chamber connected to said source via a restricted passage, said movable member opening a communication between said source and pockets upon a decrease of the pressure in said control chamber, a pilot valve controlling the pressure in said control chamber responsive to the gas pressure in a relay chamber formed with an inlet continuously communicated with said pilot valve and with two outlets, double action valve means in said relay chamber for automatically communicating said inlet to that of said outlets in which the higher gas pressure prevails, acceleration responsive means connected to the first of said outlets, controlling communication between said outlet and a low pressure, and arranged to close said communication upon occurrence of an acceleration in a predetermined direction, and a line for communicating the second of said outlets to a respiratory gas circuit in said demand regulator, wherein a pressure in excess of the ambient atmosphere prevails under high altitude conditions.

12. An apparatus according to claim 11, further comprising a pressurized waistcoat for said crew member, wherein said breathing regulator is constructed for pressurizing pockets in said waistcoat and said inflatable trouser pockets upon occurence of high altitude conditions.

13. An apparatus according to claim 1 or 12, comprising a main supply source of oxygen carried by the aircraft, and an emergency oxygen source carried by an ejectable seat of the crew member, having means for inhibiting supply of the trouser pockets responsive to acceleration after ejection.

14. A breathing and acceleration protection apparatus for the crew of fighter aircraft, having:

a source of pressurized gas, anti-g regulator valve means having an input connected to said source and an output constructed to be connected to inflatable trouser pockets of a g-suit arranged to be carried by a member of said crew, and a demand regulator arranged to deliver respiratory gas to said crew member, wherein said anti-g regulator valve means include a pressure controlled main valve, an inertia body movable along a predetermined direction responsive to acceleration along said direction, a second valve controlled by said inertia body and associated with said main valve so that said main valve controls the pressure in said pockets as an increasing function of the acceleration sensed by said inertia body, and additional means responsive to the aircraft altitude and associated with said main valve so that said main valve sets a minimum pressure in said pockets at a value which increases with altitude.

* * * * *